US011777969B2

(12) United States Patent
Bisiaux et al.

(10) Patent No.: US 11,777,969 B2
(45) Date of Patent: Oct. 3, 2023

(54) SYSTEM AND METHOD FOR DETECTING A DGA DOMAIN GENERATION ALGORITHM

(71) Applicant: EFFICIENT IP SAS, La Garenne Colombes (FR)

(72) Inventors: Jean-Yves Bisiaux, La Garenne Colombes (FR); Sylvain Galliano, La Garenne Colombes (FR); Christophe Girard, La Garenne Colombes (FR)

(73) Assignee: EFFICIENT IP SAS, La Garenne Colombes (FR)

( * ) Notice: Subject to any disclaimer, the term of this patent is extended or adjusted under 35 U.S.C. 154(b) by 180 days.

(21) Appl. No.: 17/065,752

(22) Filed: Oct. 8, 2020

(65) Prior Publication Data

US 2021/0112084 A1   Apr. 15, 2021

(30) Foreign Application Priority Data

Oct. 10, 2019   (FR) ...................................... 1911252

(51) Int. Cl.
*H04L 9/40* (2022.01)
(52) U.S. Cl.
CPC ...... *H04L 63/1425* (2013.01); *H04L 63/0236* (2013.01); *H04L 63/145* (2013.01); *H04L 63/1416* (2013.01)
(58) Field of Classification Search
CPC ............ H04L 63/1416; H04L 63/0236; H04L 63/145
See application file for complete search history.

(56) References Cited

U.S. PATENT DOCUMENTS

| 8,260,914 | B1* | 9/2012 | Ranjan | ................... H04L 63/12 |
| | | | | 709/224 |
| 10,685,295 | B1* | 6/2020 | Ross | ...................... G06N 20/00 |
| 2019/0026355 | A1* | 1/2019 | Yano | ......................... G06F 8/77 |

FOREIGN PATENT DOCUMENTS

CN         106576058 A  *  4/2017  .......... G06F 21/554

OTHER PUBLICATIONS

DGA Botnet detection using Collaborative Filtering and Density-based Clustering (Year: 2015).*
CODDULM: An Approach for Detecting C&C Domains of DGA on Passive DNS Traffic (Year: 2017).*
(Continued)

*Primary Examiner* — Lynn D Feild
*Assistant Examiner* — Saad Ahmad Abdullah
(74) *Attorney, Agent, or Firm* — Leason Ellis LLP

(57) ABSTRACT

The present invention relates to a method and a detection device for detecting a DGA domain generation algorithm in a computer communication network (106) comprising at least one server (104) for resolving DNS requests from at least one client terminal (102). The computer communication network (106) further includes a detection module (108) coupled to the resolution server (104) and configured to analyse DNS queries according to the following steps:
  for each DNS request, associate the requested domain name and the identity of the requesting client terminal to form a tuple;
  combine tuples into homogeneous partitions according to the tuple community detection technique; and
  deduce for each homogeneous partition all the client terminals using a same DGA.

9 Claims, 7 Drawing Sheets

(56) References Cited

OTHER PUBLICATIONS

Han et al. "CODDULM: An approach for detecting C&C domains of DGA on passive DNS traffic." 2017 6th International Conference on Computer Science and Network Technology (ICCSNT). IEEE, 2017. 4 pages.
Liu et al. "CCGA: Clustering and Capturing Group Activities for DGA-Based Botnets Detection." 2019 18th IEEE International Conference On Trust, Security And Privacy In Computing And Communications/13th IEEE International Conference On Big Data Science And Engineering (TrustCom/BigDataSE). IEEE, 2019. 8 pages.
Nguyen et al.. "DGA botnet detection using collaborative filtering and density-based clustering." Proceedings of the Sixth International Symposium on Information and Communication Technology 2015. 7 pages.
Guillaume, "Bipartite Structure of All Complex Networks" Bipartite Structure of All Complex Networks, Modularities for bipartite networks. Information Processing Letters 90(6), 215-221. 2004.
J.M. Kumpula; J. Saramäki; K. Kaski & J. Kertész (2007). "Limited resolution in complex network community detection with Potts model approach". European Physical Journal B. 2007.
Dugué, N.; & Perez, A. "Directed Louvain: maximizing modularity in directed networks", Doctoral dissertation, University of Orleans. 2015.
Blondel, Vincent D; Guillaume, Jean-Loup; Lambiotte, Renaud; Lefebvre, Etienne (Oct. 9, 2008). "Fast unfolding of communities in large networks". Journal of Statistical Mechanics: Theory and Experiment. 2008.
Gennaro Cordasco and Luisa Gargano, "Community Detection via Semi-Synchronous Label Propagation Algorithms", Dipartimento di Informatica ed Applicazioni "R.M. Capocelli" University of Salerno, 2011.
M. Rosvall, D. Axelsson, and C.T. Bergstrom, "The Map Equation", Eur. Phys. J. Special Topics 178, 13-23. EDP Sciences, Springer-Verlag 2010 / DOI: 10.1140/epjst/e2010-01179-1.
Newman and Girvan, "Finding and evaluating community structure in networks", Department of Physics and Center for the Study of Complex Systems, University of Michigan. 2003.
Zhicheng Liu; Xiaochun Yun; Yongzheng Zhang; Yipeng Wang, "CCGA: Clustering and Capturing Group Activities for DGA-based botnets detection", 18th IEEE International Conference On Trust, Security And Privacy In Computing And Communications/13th IEEE International Conference On Big Data Science And Engineering. 2019.
J. A. Hartigan and M. A. Wong, "Algorithm AS 136: A K-Means Clustering Algorithm", Journal of the Royal Statistical Society, Series C, vol. 28, No. 1, 1979.
Ester, H.-P. Kriegel, J. Sander, and X. Xu, "A density-based algorithm for discovering clusters in large spatial databases with noise", in Proceedings of the 2nd International Conference on Knowledge Discovery and Data mining. 1996.
Murata, "Detecting Communities from Bipartite Networks based on Bipartite Modularities", International Conference on Computational Science and Engineering, 2009.

\* cited by examiner

[Fig. 1]
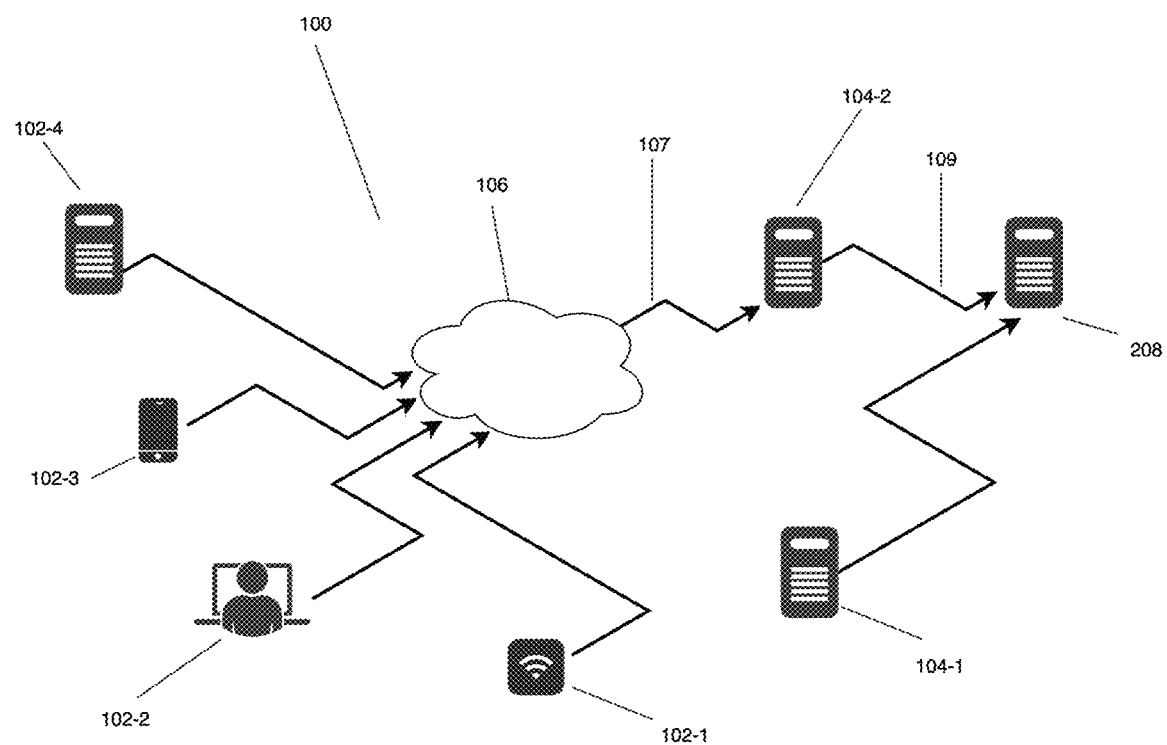

[Fig. 2]
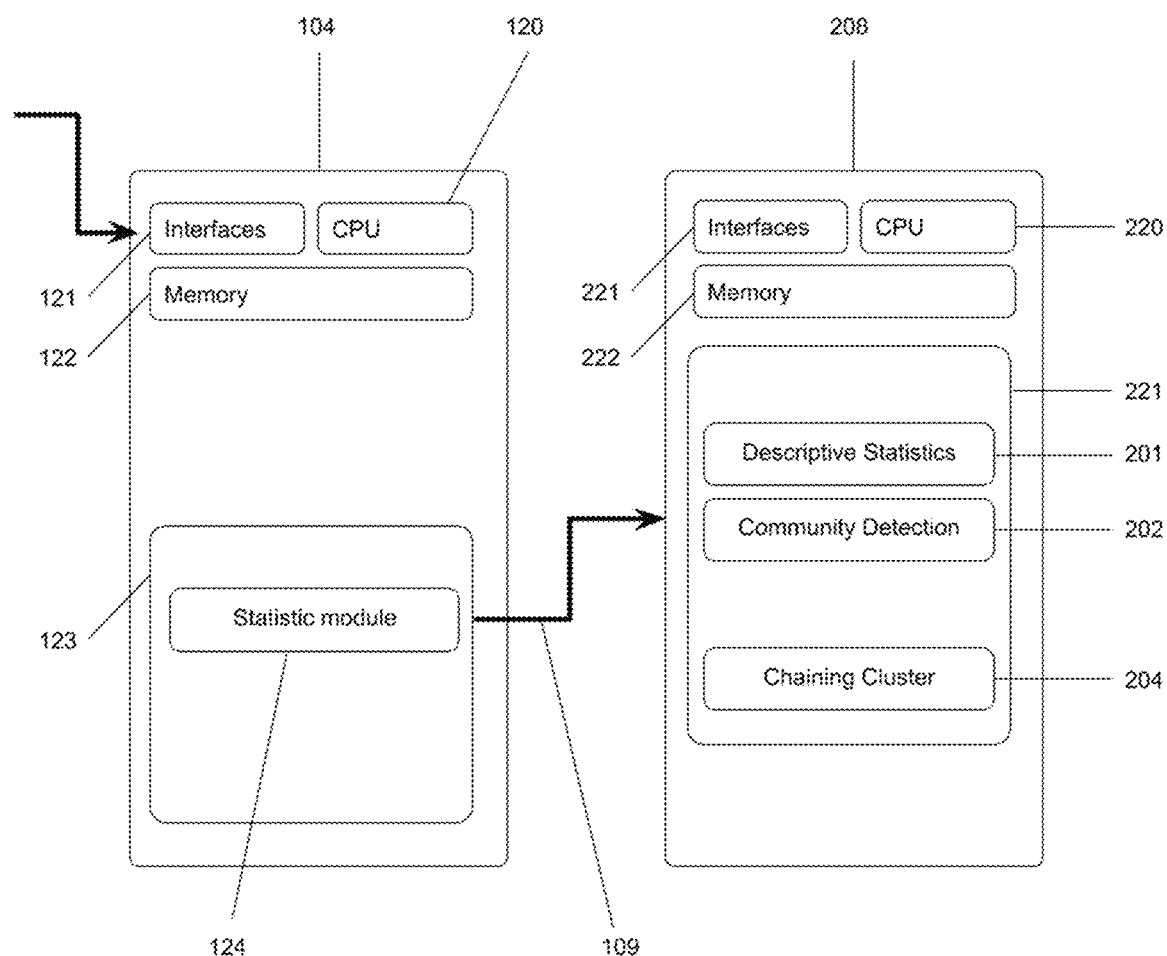

[Fig. 3]
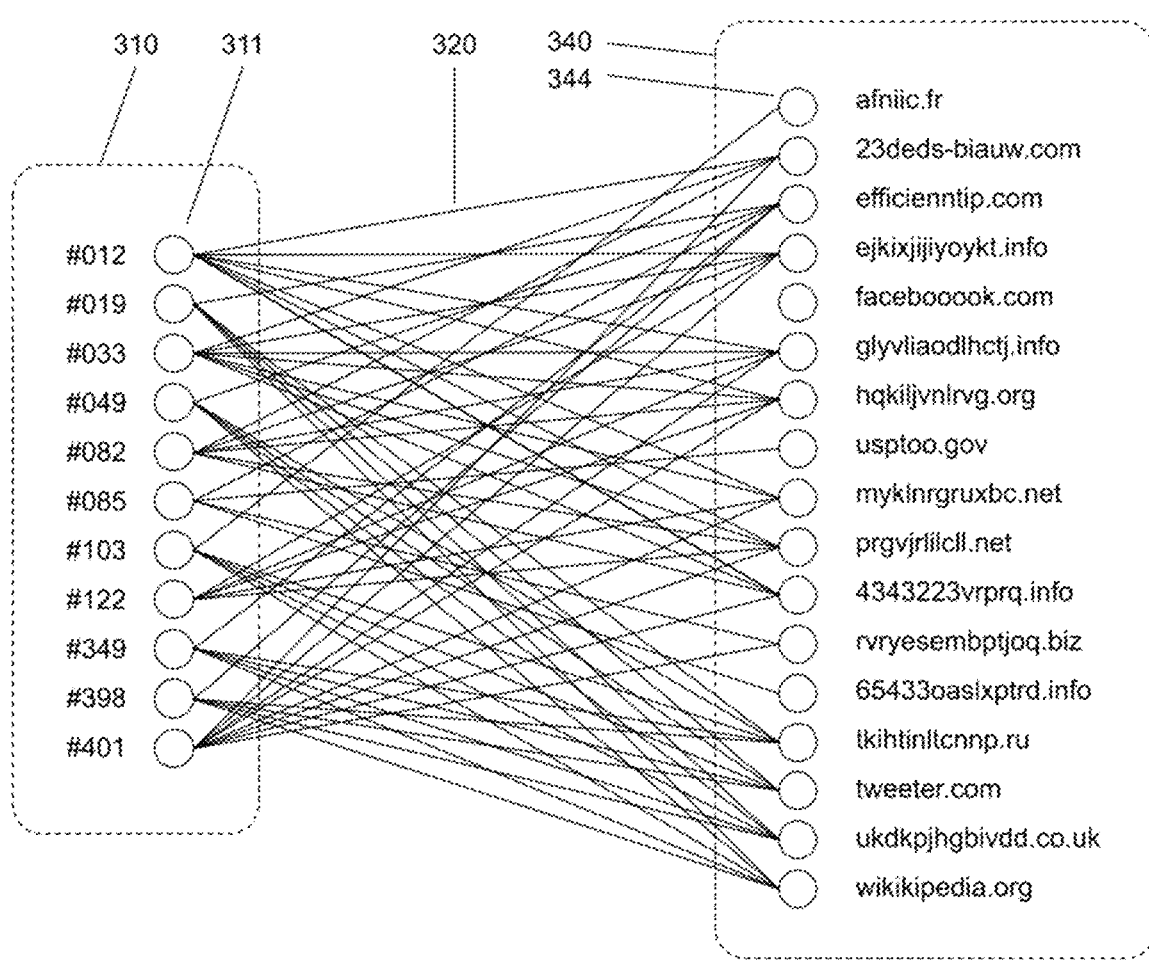

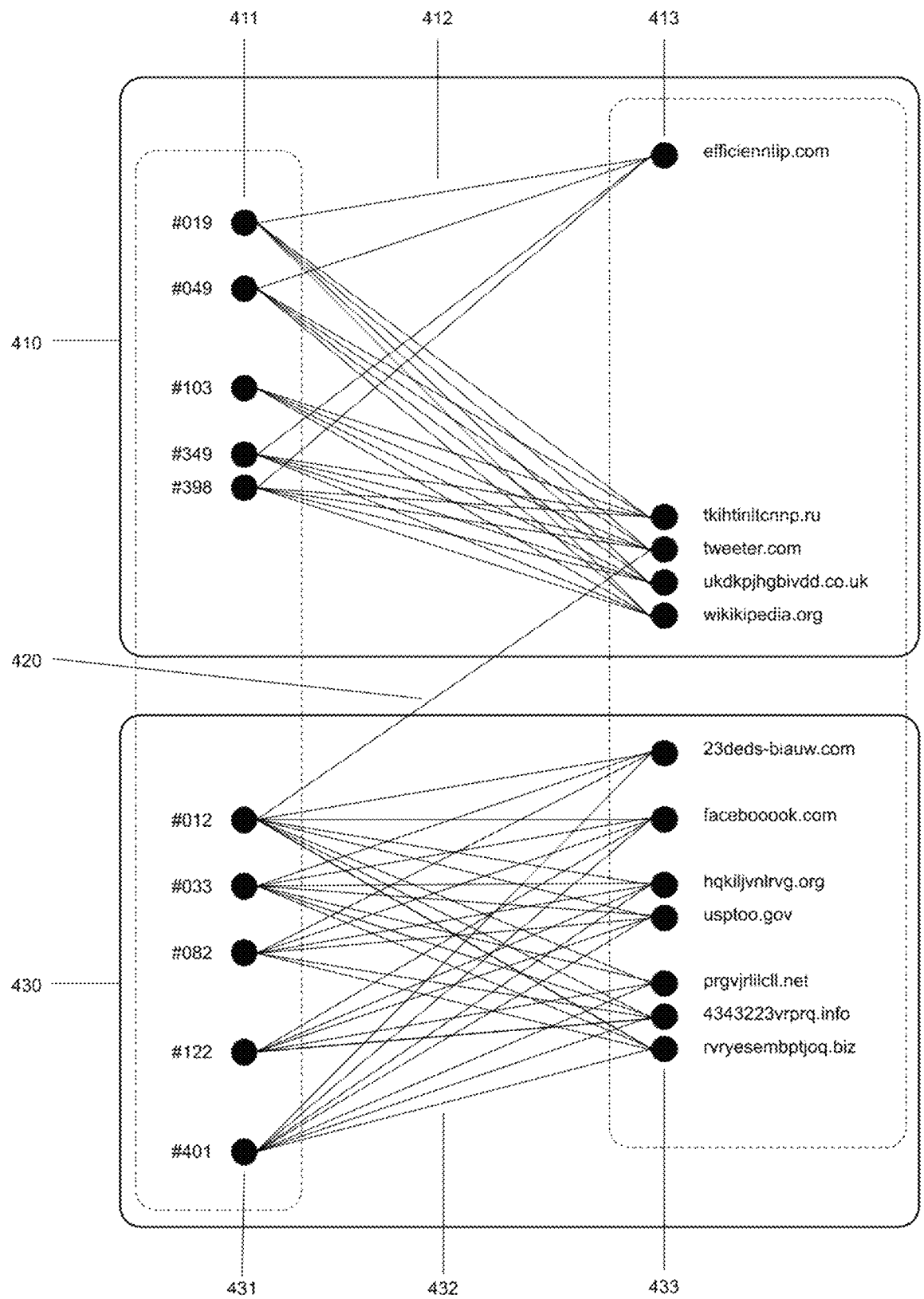
[Fig. 4]

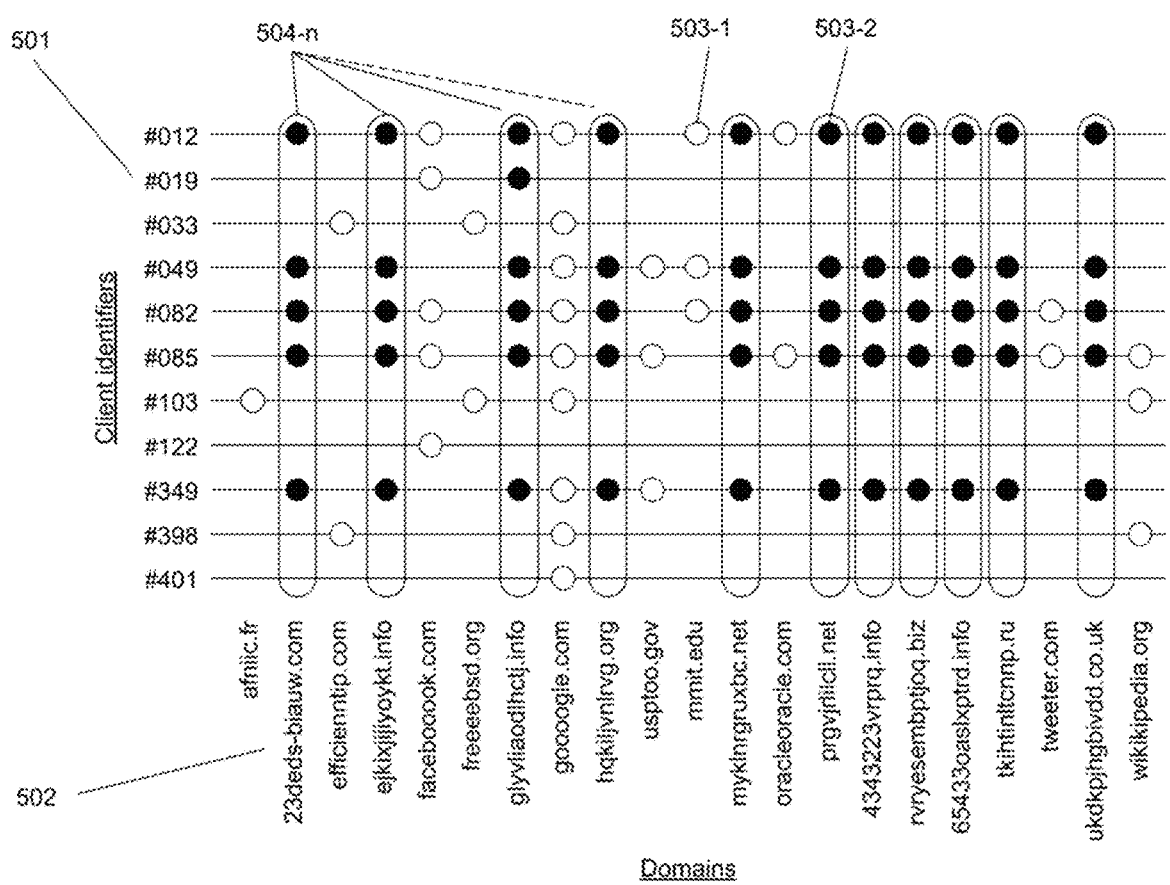

[Fig. 6]
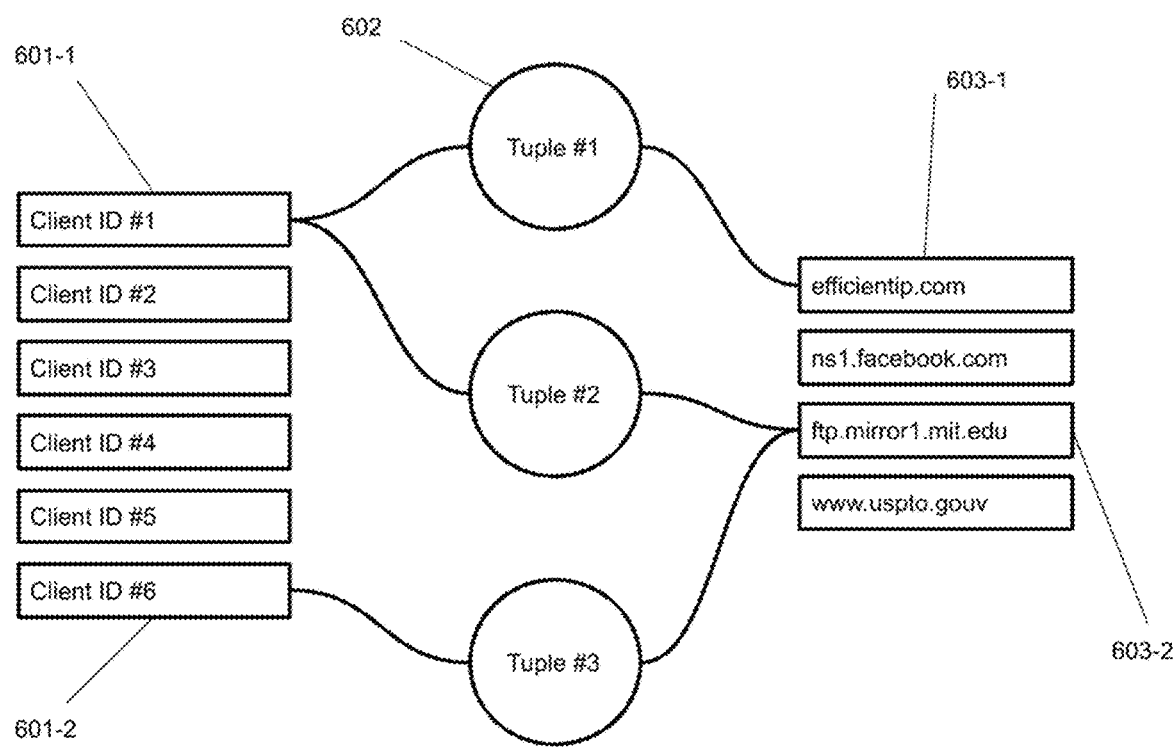

[Fig. 7]
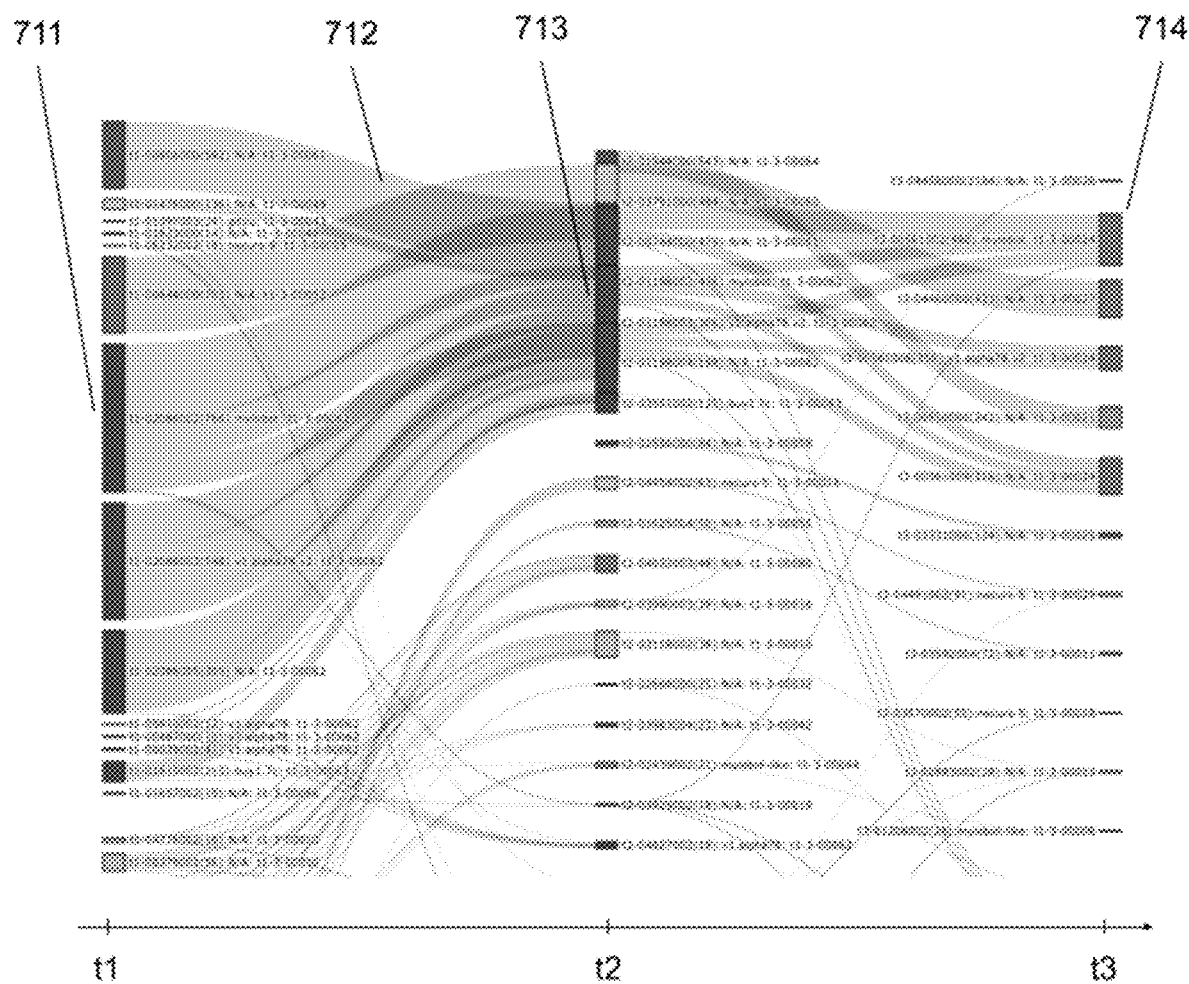

SYSTEM AND METHOD FOR DETECTING A DGA DOMAIN GENERATION ALGORITHM

CROSS-REFERENCE TO RELATED PATENT APPLICATIONS

This application claims the benefit of priority of French Patent Application number 1911252 filed Oct. 10, 2019, which is incorporated by reference in its entirety.

FIELD OF THE INVENTION

The present invention relates to the detection of a domain generation algorithm, also called DGA for "Domain Generation Algorithm". It has a general application in the detection of malicious software (malware) exploiting a DGA.

CONTEXT OF THE INVENTION

Generally speaking, a DGA is a technique for generating large quantities of Internet domain names. The domain names generated by DGA in this way are not, for the vast majority of them, registered in the domain name systems (also known as DNS for Domain Name System), i.e. DNS resolution requests result in NXDOMAIN (non existing domain) as a negative return code to a DNS request.

The DGA technique is generally used by malicious software insidiously installed on terminals, peripherals or connected objects such as telephones, computers, tablets, cameras, alarm systems, . . . .

Malware exploiting DGAs can include adware, spyware, viruses, worm, trojan, keylogger, rootkit, phishing, spear phishing, bots, botnets, ransomware, among others.

Malware is most often monitored and controlled by a remote accomplice server that it locates by resolving a domain name via the DNS protocol. This server is called C&C for "server Command & Control" in the vocabulary of cybersecurity. To prevent the accomplice server from being discovered, the malware regularly changes its name from a deterministically generated list. Names on this list are generated by a DGA algorithm used jointly by the C&C server and the malware.

Malware can spread by multiplying and distributing itself across a network in order to carry out a massive distributed cyber attack or to hide in a large stream of requests.

Malware detection systems are already known. Generally they are based on the analysis of the domain name generated by DGA. The analysis techniques are generally lexical, character frequency, character sequencing or any other entropy calculation. For example, clustering by lexical analysis is described in the publication [CODDULM] Chunyu Han; Yongzheng Zhang. *CODDULM: An Approach for Detecting C&C Domains of DGA on Passive DNS Traffic*. 2017 6th International Conference on Computer Science and Network Technology. 2017.

Today, such known detection systems are no longer totally satisfactory since they generate many false positives due to the generic domain names used by the cloud, for example, for virtual machines or micro services. Or, these detection systems have become ineffective because the designers of the latest generation of DGAs have evolved their algorithms to find technical parries by imitating common Internet names. Some of them are based on dictionaries of natural words such as suppobox, matsnu, gozi, nymaim2, or pizd, among others.

The present invention improves the situation.

It relates to a method for detecting a DGA domain generation algorithm in a computer communication network comprising at least one server for resolving DNS requests from at least one client terminal.

SUMMARY OF THE INVENTION

According to a general definition of the invention, the computer communication network further comprises a detection module coupled to the DNS query resolution server and configured to analyse DNS queries according to the following steps:
- for each DNS request collected by a resolution server, associate the requested domain name and the identity of the requesting client terminal to form a unique tuple;
- combine tuples into homogeneous partitions according to the community detection technique; and
- deduce for each homogeneous partition thus combined, all the client terminals using the same DGA.

In practice, the analysis is based on the behaviour of the client terminals that use the DGA by comparing said behaviour with each other. The objective of the detection is to detect similarities in the behaviour of client terminals in general and more specifically all the domains common to a DGA required by a set of client terminals infected by malicious software exploiting said DGA.

The applicant observed that only DNS queries to unknown domain names are of interest here for malware detection.

Surprisingly, the applicant also observed that client terminals infected with the same malware make a common set of DNS queries. That is to say, all client terminals of a limited set of client terminals have requested all domain names of a limited set of domains. Thus, almost all the client terminals in a set that will request almost all the domains in a set will give here a high level of similarity in DNS client terminal behaviour.

A client terminal can be infected simultaneously by several malware, and thus host several DGAs, which will have different domain forms. As a result, a client terminal may be located in more than one grouping.

According to a first non-limiting embodiment, the process includes a filtering by descriptive statistics which makes it possible to eliminate tuples whose behaviour is not significant of a DGA, such as the functions of covariance, standard deviation or calculation of Euclidean distance, when thresholds are exceeded.

According to a second, non-limiting embodiment, the detection of tuples communities is realized from a bipartite graph that includes:
a. a plurality of client terminal nodes;
b. a plurality of domain nodes;
c. a plurality of edges, each representing a DNS query from a client terminal node to a domain node; a domain node being connectable to multiple client terminal nodes and a client terminal node being connectable to multiple domain nodes, and
d. the search for communities of nodes in said bipartite graph being capable of generating distinct partitions, themselves distributed in bipartite graphs including tuples representing a coherent set of client terminals making DNS queries on a set of domains.

Good partitioning of a bipartite graph implies a high number of intra-community edges and a low number of inter-community edges. One of the main methods to evaluate the quality of the structure of the discovered communities is based on the calculation of modularity (Q) as proposed below by Newman and Girvan [NEW2004] *Newman and Girvan. Finding and evaluating community structure in networks. Department of Physics and Center for the Study of Complex Systems*, University of Michigan. 2004.

The measure of the modularity of communities in a graph can be calculated with the modularity (Q) formula of Newman and Girvan [NEW2004].

$$Q = \Sigma_{c=1}{}^{n}[L_c/m - (k_c/2m)^2]$$

Where (m) is the number of network edges, ($L_c$) is the number of intra-community edges for community (c), ($k_c$) is the sum of the degrees of the nodes in community (c). Other modularity calculations can be used here like those of Murata [MUR01] Murata, T. *Modularities for bipartite networks. In HT '09: Proceedings of the Twentieth ACM Conference on Hypertext and Hypermedia*, New York, NY, USA. ACM. 2009, Latapy [LATA01] Guillaume and Latapy. *Modularities for bipartite networks. Information Processing Letters* 90(6), 215-221. 2004, Potts [POTTS02] J. M. Kumpula; J. Saramäki; K. Kaski & J. Kertész (2007). *"Limited resolution in complex network community detection with Potts model approach". European Physical Journal B*. 2007 or Dugué [DUG01] Dugué, N.; & Perez, A. *Directed Louvain: maximizing modularity in directed networks. Doctoral dissertation*, University of Orleans. 2015.

This method of implementation has the particularity of exploiting without limitation community detection algorithms, which maximize modularity, such as Louvain [LOUV01] Blondel, Vincent D; Guillaume, Jean-Loup; Lambiotte, Renaud; Lefebvre, Etienne (9 Oct. 2008). *"Fast unfolding of communities in large networks". Journal of Statistical Mechanics: Theory and Experiment*. 2008 and/or Label Propagation Algorithms (LPA) [LPA011] Gennaro Cordasco and Luisa Gargano. *Community Detection via Semi Synchronous Label Propagation Algorithms. Dipartimento di Informatica ed Applicazioni* "R. M. Capocelli" University of Salerno, 2011, or as infomap [INFOMAP] M. Rosvall, D. Axelsson, and C. T. Bergstrom. *The Map Equation. Eur. Phys. J. Special Topics* 178, 13-23. *EDP Sciences*, Springer-Verlag 2010/DOI: 10.1140/epjst/e2010-01179-1. 2009 which is based on the search for flow patterns in a network.

Unlike other DGA detection techniques such as the publications *Clustering and Capturing Group Activities for DGA-based botnets detection* [CCGA] Zhicheng Liu; Xiaochun Yun; Yongzheng Zhang; Yipeng Wang. CCGA: *Clustering and Capturing Group Activities for DGA-based botnets detection. 18th IEEE International Conference On Trust, Security And Privacy In Computing And Communications/13th IEEE International Conference On Big Data Science And Engineering*. 2019 or *DGA Botnet detection using Collaborative Filtering and Density-based Clustering* [DGABOT1] Trung-Duc Nguyen; Tuan-Dung Cao; Linh-Giang Nguyen. *DGA Botnet detection using Collaborative Filtering and Density-based Clustering. Proceedings of the Sixth International Symposium on Information and Communication Technology*. 2015 & 18*th IEEE International Conference*. 2019, the process conforming to the invention does not use density clustering in the first phase for questions of implementation difficulty, quality and performance.

Indeed, the Applicant observed firstly that clustering by density is difficult to implement compared to the community detection. The data used is structured in two dimensions: the domain and the numerical value of the number of end-customers who have made a query on the same domain. Density clustering algorithms then group domains into N clusters. The K-Means [KMEAN] algorithm J. A. Hartigan and M. A. Wong. *Algorithm AS* 136: *A K-Means Clustering Algorithm, Journal of the Royal Statistical Society, Series C*, vol. 28, no 1, 1979, requires to specify the number N of cluster to find what is not relevant since we do not know it. The DBSCAN [DBSCAN] algorithm M. Ester, H.-P. Kriegel, J. Sander, and X. Xu, *A density-based algorithm for discovering clusters in large spatial databases with noise, in Proceedings of the 2nd International Conference on Knowledge Discovery and Data mining*. 1996 will vary the number of clusters N according to other parameters such as the distance threshold suitable for the density of the number of terminal clients per domain and noise identification factor. Adjusting these parameters makes the DBSCAN application difficult to implement to generalize clustering on very diverse datasets.

Furthermore, the Applicant observed secondly that the accuracy of clustering by density is relatively unsatisfactory compared to the community detection. In practice, the quality of the classification is measured according to the accuracy rate (also called positive predictive value) and the recall rate (also known as sensitivity) which in the context here is the proportion of tuple of a true DGA of the cluster found on the set of tuples of a true DGA.

$$R = \frac{T_p}{F_n + T_p}$$

Where (R) is the recall, ($T_p$) the true positive corresponding to the number of tuples of the well-classified DGA in the cluster found and (Fn) the false positive corresponding to the tuple of the unclassified DGA in the cluster found. If the precision rate is rather satisfactory with density clustering, the recall rate is very variable and therefore very difficult to stabilize because of the two DBSCAN configuration parameters or even more significantly with the choice of the K variable of K-Means.

Finally, the Applicant observed secondly that the accuracy of clustering by density is insufficient compared to the community detection. In practice, the execution time of an algorithm is a function of its complexity and the volume of data to be processed. The complexity of the DBSCAN algorithm is from O(log(n)) for indexing and from linear O(n log(n)) time complexity in the best case to quadratic O($n^2$) time complexity in the worst case depending on its configuration parameters. Community detection algorithms such as Louvain [LOUV01] or Label Propagation Algorithms [LPA011], have a linear O(n) time complexity at best or at worst linearithmic O(n log(n)). Since linear or linearithmic complexity is significantly lower quadratic complexity over large processing volumes, community detection is much more efficient than density search, with a ratio of 1:1008000 times per 1 million iterations of computation.

According to a third, non-limiting embodiment, the detection of tuple communities is accompanied by a method of cluster aggregation by chaining. It should be noted that a DGA continues, over time, to generate many domains. Therefore, in a set of identified areas, many new areas will replace the previous ones. In a set, domain names are volatile and their number can vary over time.

You need a minimum number of tuples to define a cluster and thus deduct a DGA. New DGA clusters are discovered with each analysis. We can consider here the succession of clusters discovered as a flow when it is projected in time. The association between all the customers and all the domain names remains advantageously stable, which makes it possible to chain clusters discovered over a long period of time.

It should also be noted that malicious software can mutate, i.e. it can download, replace its own running code and thus have its DGA evolve. By tracking all the common customers requesting a common domain flow, the process in accordance with the invention is not sensitive to the change of DGA and can advantageously continue to follow the evolution of the DNS customer group.

The present invention also relates to a system for detecting a DGA domain generation algorithm in a computer communication network comprising at least one server for resolving DNS requests from at least one client terminal.

According to one aspect of the invention, the computer communication network further comprises a detection module coupled to the DNS resolution server and comprising data processing means configured, for each DNS request, to associate the requested domain name and the identity of the requesting client terminal to form a tuple; to combine into homogeneous partitions the tuples thus combined according to at least one chosen aggregation technique; and to deduce therefrom for each homogeneous partition all the client terminals operating the same DGA.

The present invention further comprises a computer program comprising instructions which lead the above-mentioned DGA detection system to perform the steps of the above-mentioned DGA detection method.

Other advantages and features of the invention will appear on examination of the description and drawings in which:

FIG. 1 represents schematically the environment of a computer network implementing the invention;

FIG. 2 represents schematically the structure of the components of the DNS resolution server and the DGA detection module in accordance with the invention;

FIG. 3 is a schematic example of a bipartite graph;

FIG. 4 is a schematic example of a clustered bipartite graph;

FIG. 5 is a schematic representation of the invention;

FIG. 6 schematically represents the notion of tuple; and

FIG. 7 represents schematically a cluster chaining diagram.

DETAILED DESCRIPTION OF THE FIGURES

FIG. 1 shows an example of a computer network environment 100. The computer network environment 100 can be either a public distributed environment or a private closed network environment. The computer network environment 100 may include various client terminals or computing devices 102-1, 102-2, . . . , 102-N coupled to communicate with a DNS Domain Name System query resolution server 104 via a computer communications network 106.

For example, the client terminal 102 may be an application server computing device 102-4, a mobile device 102-3 (tablet, smartphone, . . . ), a connected object 102-1, and/or a personal computer 102-2 through which a user can access an application or computing service using an application name. The client terminal 102 is distinguished by a unique identifier which can be either its IP address, its physical MAC network address, an IMSI mobile number (GSM, UMTS, or LTE), an arbitrary inventory number or any other identifier that can be used to identify a DNS client. This number can be transported in the DNS protocol header or in the extension of the EDNS protocol. In one embodiment, the DNS lookup server 104 can be a domain name server for analysing domain name requests and identifying a top-level domain (TLD) and a second-level domain (SLD) from the domain name request and for translating the domain name request into a corresponding Internet protocol. The DNS server 104 can also be a web server providing digital content access to computer devices 102, a recursive DNS server, a transfer DNS server, and a caching DNS server.

The network 106 can be a wireless or wired network, or a combination of these. Network 106 can be a set of individual networks, interconnected with each other and functioning as a single large network (for example, the Internet or an Intranet). Examples of such individual networks include, but are not limited to, the mobile telephone network, the local network, the metropolitan area network, the wide area network, the satellite network. Depending on the technology, Network 106 includes various network entities, such as transceivers, gateways, firewalls, and routers; however, these details have been omitted for ease of understanding.

The computer network environment 100 is associated with a DNS query resolution server 104 that can receive linked DNS queries from client terminals 102 via link 107 and can provide a response in the form of an IP address of servers hosting the application or other IT service. Requests can be generated when a user may intend to access an application via the client terminal 102 and enter an application name or, for example, a URL (Uniform Resource Locator) in the address bar of a Web browser. The DNS server 104 can retrieve the IP address of client terminal 102 from the received request and then use the IP address to return the response to client terminal 102. The DNS server 104 can also store the IP address of the client terminal 102 in order to respond to subsequent requests from the client terminal 102 with reduced round-trip time.

The request resolution server 104 is coupled via link 109 to a DGA detector 208, described in more detail with reference to FIG. 2.

FIG. 2 shows an example of the components of the resolution server 104 and detection system DGA 208.

The DNS server 104 may comprise one or more processors 120, one or more interfaces 121, one of which is connected to the computer network 106 via link 107 and a memory 122. In addition, DNS server 104 may include a cache 123.

Among other possibilities, cache 123 can be used as an external repository for storing information about frequently requested domain names and host IP addresses. In an embodiment of this object, cache 123 may store mapping information for domain names and their respective IP addresses. In an exemplary embodiment, cache 123 can be an internal repository within DNS server 104 to store information about frequently requested domain names.

Processor 120, among other capabilities, can be configured to retrieve and execute computer-readable instructions stored in memory 122. Processor 120 may be implemented in the form of one or more microprocessors, microcomputers, microcontrollers, digital signal processors, central processing units, state machines, logic circuits and/or any device which manipulates signals on the basis of operational instructions. The functions of the various elements shown in FIG. 2, including all function blocks labelled "processor(s)", can be provided through the use of dedicated hardware as well as hardware capable of running software in combination with appropriate software. When provided by a processor, functions may be provided by a single dedicated processor, by a single shared processor, or by a plurality of individual processors, some of which may be shared. Furthermore, the explicit use of the term "processor" shall not be construed as referring exclusively to hardware capable of executing software, and may implicitly include, without limitation, Digital Signal Processor (DSP) hardware, network processor, Application Specific Integrated Circuit (ASIC), Field Programmable Gate Array (FPGA), Read Only Memory (ROM) for software storage, Random Access Memory (RAM), non-volatile memory.

Other materials, conventional and/or customized, can also be included.

One or more interfaces 121 may include a variety of interfaces and machine-readable hardware interfaces that allow the DNS server 104 to interact with different entities, such as processor 120, cache module 123. In addition, the one or more interfaces 121 may allow DNS server components 104 to communicate with other DNS servers and external repositories. Interfaces 121 can facilitate multiple communications in a wide variety of networks and protocol types, a local area network, and so on.

The DGA detection system 208 may comprise one or more processors 220, one or more interfaces 221, one of which is connected to cache 123 via link 109 and a memory 222

Memory 222 can be coupled to Processor 220 and can, among other capabilities, provide data and instructions to generate various queries. Memory 222 may include any computer-readable medium known in the art, including, for example, volatile memory, such as static random access memory (SRAM) and dynamic random access memory (DRAM), and/or non-volatile memory, such as read-only memory (ROM), erasable programmable read-only memory, flash memories, hard disks, optical disks and magnetic tapes.

In practice, the DGA 208 detector includes a module 200 configured to perform tuple aggregation methods, which are described in more detail below.

The following aggregation techniques are used independently or successively to aggregate/combine tuples: descriptive statistics 201, algorithms based on community detection 202 and cluster chaining methods 204.

With reference to FIG. 3 [FIG. 3], the representation of a bipartite graph structured by a set of client terminal 310 and domain 340 nodes. An edge 320 represents the DNS request from a client terminal node 311 to a domain node 344. A domain node 344 can be connected to multiple client terminal nodes 311, just as a client terminal 311 can be connected to multiple domains 344.

Thus, the detection of communities of domains is carried out from a bipartite graph including:
a. a plurality of nodes of client terminal 310 type;
b. a plurality of domain type nodes 340;
c. a plurality of edges 320, each representing a DNS query from a client terminal node 311 to a domain node 344; a domain node 344 being connectable to multiple client terminal nodes 311 and a client terminal node 311 being connectable to multiple domain nodes 344.

FIG. 4 represents a portion of the bipartite graph shown in FIG. 3 that was processed through a community detection. The community detection result creates a first cluster 410 containing client terminal type nodes 411 and domain type nodes 413, and a separate cluster 430 containing client terminal type nodes 431 and domain type nodes 433. Each node belonging to a cluster has an inter-community edge 412 or 432, an inter-community edge 420 connects two nodes belonging to different communities.

Thus, the search for communities of nodes in said bipartite graph being capable of generating distinct partitions 410, 430, themselves distributed in bipartite graphs including tuples representing a coherent set of client terminals making DNS queries on a set of domains.

FIG. 5 illustrates the relationships between the domains and the clients. One row represents the client ID 501 and one column represents a domain name 502. The intersection of a row and a column, here called tuple 503, represents a request made by this client for this domain name. A cluster 504-$n$ is the set of tuples for which roughly the same clients 501 have made queries on roughly the same domains 502. Tuples whose domain corresponds to a DGA 503-2 are part of clusters 504-$n$. Tuples whose domain does not correspond to a DGA 503-1 do not belong to a cluster 504-$n$.

FIG. 6 describes a tuple. The tuple 602 is a relationship between a domain name 603 requested by a client 601. The client terminal 601 is distinguished by a unique identifier which can be either its IP address, its physical MAC network address, an IMSI mobile number (GSM, UMTS, or LTE), an arbitrary inventory number or any other identifier that can be used to identify a DNS client. This number can be transported in the DNS protocol header or in the extension of the EDNS protocol.

FIG. 7 shows a diagram of cluster chaining over time between several periods 711, 713, 714. Chaining 721 allows to connect one or more clusters to one or more clusters between two clustering periods 711, 713, 714. The succession of chaining over more than two periods makes it possible to follow by overlapping the evolution of a cluster including divisions and mergers. The temporal dimension thus makes it possible to enrich clustering processes by chaining.

The above description has been directed to specific embodiments. However, it will become apparent that other variants and modifications can be made to the embodiments described, with all or part of their advantages being obtained. For example, it is expressly contemplated that the components and/or elements described herein may be implemented as software stored on a tangible (non-transient) computer-readable medium (e.g. disks/CD/RAM/EEPROM/etc.) having program instructions executed on a computer, computer hardware, firmware or a combination of these elements. Accordingly, this description should be taken only as an example and should not otherwise limit the scope of the embodiments described here. Accordingly, the purpose of the annexed claims is to cover all variations and amendments as they fall within the true spirit and scope of the modes of performance described herein.

The invention claimed is:

1. Method for the detection of a domain generation algorithm (DGA) in a computer communication network comprising at least one resolution server for resolving domain name system (DNS) requests emanating from at least one client terminal, characterized in that the computer communication network further comprises a detection module coupled to the at least one resolution server and configured to analyze the DNS requests according to the following steps:
for each DNS request, associate the requested domain name and the identity of the requesting client terminal to form a tuple;
combine the tuples into homogeneous partitions according to a community detection technique; and
deduce for each homogeneous partition all the client terminals using the same DGA; and
measure a quality of clustering according to a calculation of a modularity of the tuples in detected communities, wherein the community detection technique is carried out from a first bipartite graph comprising:
a) a plurality of client terminal nodes;
b) a plurality of domain nodes;
c) a plurality of edges each representing a DNS query from a first client terminal node to a first domain node, the first domain node being connectable to multiple client terminal nodes, and the first client terminal node being connectable to multiple domain nodes; and
d) the community detection of tuples in the bipartite graph being capable of generating distinct partitions distributed in at least a second bipartite graph including tuples representing a coherent set of client terminals making DNS queries on a set of domains.

2. Method according to claim 1, further comprising a descriptive statistical filtering step.

3. Method according to claim 2, characterized in that the descriptive statistic is a covariance, standard deviation or Euclidean distance calculation function.

4. System for detecting a domain generation algorithm (DGA) in a computer communication network comprising at least one domain name system (DNS) request resolution server for resolving DNS requests from at least one client terminal, characterized in that the computer communication network further comprises:
a hardware-based detection device coupled to the resolution server and comprising data processing means configured, for each DNS request, to associate the requested domain name and the identity of the requesting client terminal to form a tuple; to combine in homogeneous partitions the tuples thus combined according to the community detection technique; and to deduce for each homogeneous partition all the client terminals using a same DGA; and
a hardware-based processor for measuring a quality of clustering according to a calculation of a modularity of the tuples in detected communities,
wherein the community detection technique is carried out from a first bipartite graph comprising:
a) a plurality of client terminal nodes;
b) a plurality of domain nodes;
c) a plurality of edges each representing a DNS query from a first client terminal node to a first domain node, the first domain node being connectable to multiple client terminal nodes, and the first client terminal node being connectable to multiple domain nodes; and
d) the community detection of tuples in the bipartite graph being capable of generating distinct partitions distributed in at least a second bipartite graph including tuples representing a coherent set of client terminals making DNS queries on a set of domains.

5. The system according to claim 4, further comprising: a descriptive statistical filter.

6. The system according to claim 5, characterized in that the descriptive statistic is a covariance, standard deviation or Euclidean distance calculation function.

7. A non-transient computer-readable medium having program instructions executed on a computer for the detection of a domain generation algorithm (DGA) in a computer communication network comprising at least one resolution server for resolving domain name system (DNS) requests emanating from at least one client terminal, characterized in that the computer communication network further comprises a detection module coupled to the resolution server and configured to analyse analyze the DNS requests according to the following steps:
for each DNS request, associate the requested domain name and the identity of the requesting client terminal to form a tuple;
combine the tuples into homogeneous partitions according to a community detection technique; and
deduce for each homogeneous partition all the client terminals using the same DGA; and
measure a quality of clustering according to a calculation of a modularity of the tuples in detected communities,
wherein the community detection technique is carried out from a first bipartite graph comprising:
a) a plurality of client terminal nodes;
b) a plurality of domain nodes;
c) a plurality of edges each representing a DNS query from a first client terminal node to a first domain node, the first domain node being connectable to multiple client terminal nodes, and the first client terminal node being connectable to multiple domain nodes; and
d) the community detection of tuples in the bipartite graph being capable of generating distinct partitions distributed in at least a second bipartite graph including tuples representing a coherent set of client terminals making DNS queries on a set of domains.

8. The computer-readable medium according to claim 7, further comprising a descriptive statistical filtering step.

9. The computer-readable medium according to claim 8, characterized in that the descriptive statistic is a covariance, standard deviation or Euclidean distance calculation function.

* * * * *

UNITED STATES PATENT AND TRADEMARK OFFICE
CERTIFICATE OF CORRECTION

PATENT NO. : 11,777,969 B2  
APPLICATION NO. : 17/065752  
DATED : October 3, 2023  
INVENTOR(S) : Jean-Yves Bisiaux et al.

Page 1 of 1

It is certified that error appears in the above-identified patent and that said Letters Patent is hereby corrected as shown below:

In the Claims

Column 10, At Claim 7, beginning at Line 17:
"...configured to analyse analyze the DNS requests according to the following steps..."
Should be:
"...configured to analyze the DNS requests according to the following steps..."

Signed and Sealed this
Twenty-first Day of November, 2023

Katherine Kelly Vidal
*Director of the United States Patent and Trademark Office*